United States Patent [19]

Williamson

[11] Patent Number: 4,658,237

[45] Date of Patent: Apr. 14, 1987

[54] INTRUSION ALARM SYSTEM FOR VEHICLES

[75] Inventor: John D. Williamson, North Canton, Ohio

[73] Assignee: Omnitronics Research Corporation, Akron, Ohio

[21] Appl. No.: 373,636

[22] Filed: Apr. 30, 1982

Related U.S. Application Data

[63] Continuation of Ser. No. 115,881, Jan. 28, 1980, abandoned.

[51] Int. Cl.⁴ ............................................. B60R 25/00
[52] U.S. Cl. .................................... 340/63; 340/528; 340/539
[58] Field of Search ............... 340/63, 64, 65, 539, 340/540, 541, 527, 528, 37, 636, 902, 988; 455/95, 99, 100, 58, 52

[56] References Cited

U.S. PATENT DOCUMENTS

| | | | |
|---|---|---|---|
| 3,533,064 | 10/1970 | Perelman | 340/63 |
| 3,665,312 | 5/1972 | Jarvis | 325/54 |
| 3,703,703 | 11/1972 | Payne | 340/63 |
| 3,740,713 | 6/1973 | Teich | 340/64 |
| 3,796,958 | 3/1974 | Johnston et al. | 325/185 |
| 3,864,674 | 2/1975 | Worsham et al. | 340/539 |
| 3,909,826 | 9/1975 | Schildmeier et al. | 340/539 |
| 4,012,728 | 3/1977 | Fowler | 340/224 |
| 4,013,994 | 3/1977 | Ragano et al. | 340/539 |
| 4,148,020 | 4/1979 | Siemer et al. | 340/539 |
| 4,162,449 | 7/1979 | Bouyssounouse et al. | 325/55 |
| 4,162,479 | 7/1979 | Nickell et al. | 340/63 |
| 4,177,466 | 12/1979 | Reagan | 343/112 |
| 4,186,710 | 2/1980 | Kilgore | 123/146.5 |
| 4,187,496 | 2/1980 | Kovens et al. | 340/63 |
| 4,187,497 | 2/1980 | Howell et al. | 340/65 |
| 4,216,545 | 8/1980 | Flickshu et al. | 455/77 |
| 4,218,763 | 8/1980 | Kelley et al. | 340/65 |
| 4,238,778 | 12/1980 | Ohsumi | 340/902 |
| 4,246,573 | 1/1981 | Kiss | 340/539 |

Primary Examiner—Donnie L. Crosland
Attorney, Agent, or Firm—Renner, Kenner, Greive, Bobak & Taylor

[57] ABSTRACT

An alarm system (10) for detecting unauthorized intrusion into a vehicle and determining the location of such vehicle includes a vehicle alarm (11) and one or more networks (12, 13, 14) for receiving the output signal from vehicle alarm (11). Vehicle alarm (11) includes a transmitter (40) for broadcasting a low frequency modulated radio frequency alarm signal at the citizen band distress frequency and a control unit (25) for selectively activating the alarm upon a drop in the voltage magnitude of the vehicle power supply (27) induced by an unauthorized intrusion. Networks (12, 13, 14) respectively include citizen band radio detectors (15), mobile dedicated alarm detectors (16), and fixed dedicated alarm detectors (17) accompanied by a display unit (18).

4 Claims, 4 Drawing Figures

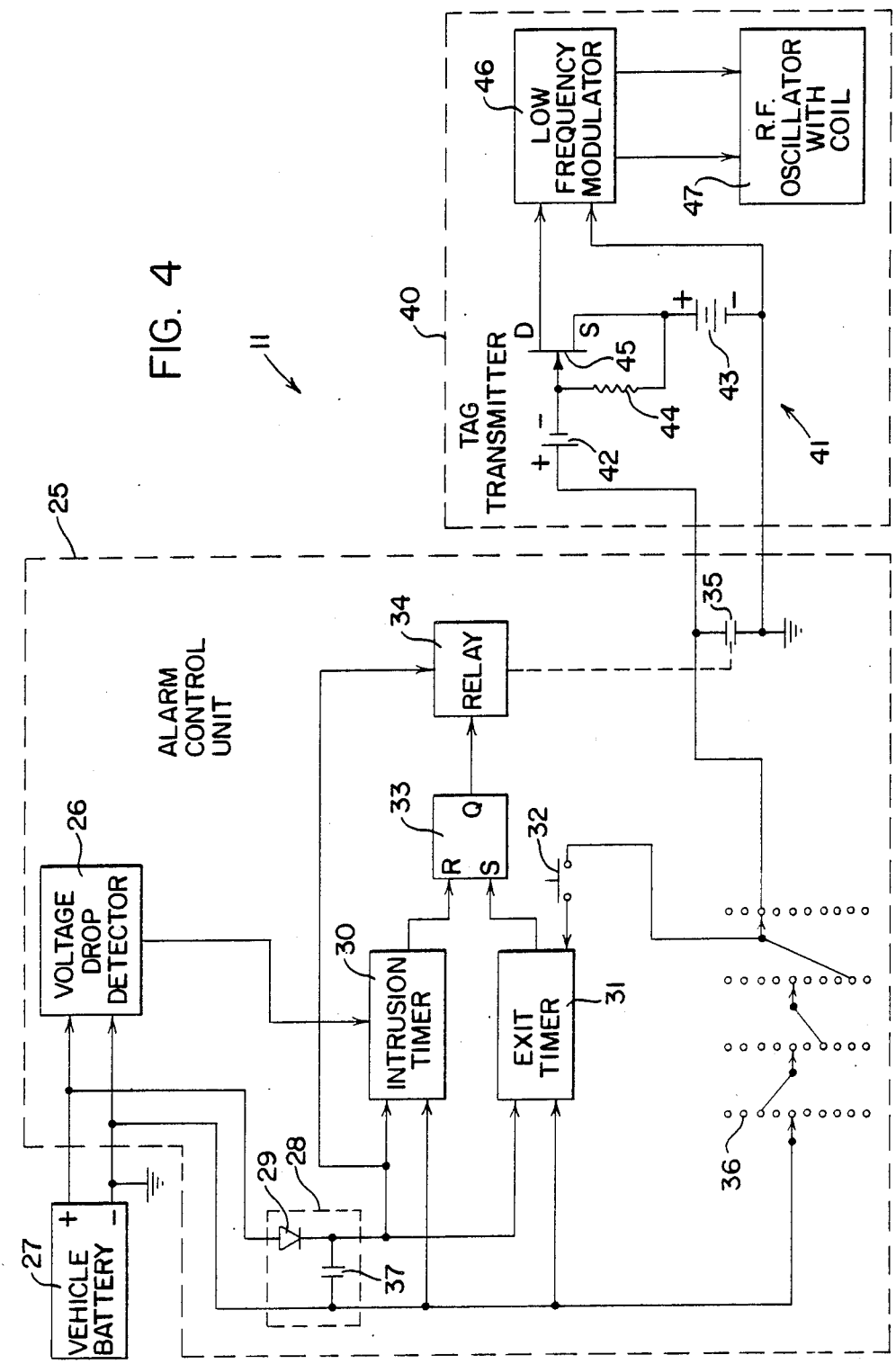

INTRUSION ALARM SYSTEM FOR VEHICLES

This application is a continuation of application Ser. No. 115,881 filed Jan. 28, 1980, now abandoned.

TECHNICAL FIELD

The present invention pertains generally to an alarm system for vehicles. More particularly, the present invention relates to an alarm system for detecting unauthorized intrusion into a vehicle and determining the location of such vehicle.

BACKGROUND ART

In recent times the theft of mobile vehicles such as boats, planes, recreational vehicles, trucks and, in particular automobiles has grown to alarming proportions. In an attempt to reverse this trend and defeat theft attempts, numerous devices have been devised to provide an alarm signal or to disable the vehicle in the event of an unauthorized entry.

Those deterrent systems which provide an alarm utilize an audio alarm hoping to frighten the prospective thief and/or broadcast a radio frequency alarm signal. However, because such systems normally rely for their power on the vehicle electrical system, it is possible to quickly disable the same. Moreover, those systems which broadcast a radio frequency alarm signal require the construction of extensive and costly receiving networks and/or mobile telemetry transceivers to detect and locate an alarm signal.

Those deterrent systems which attempt to disable the vehicle, as by ignition or fuel cut-off, or steering column lock out, also may be disabled by the experienced thief, may inadvertently preclude the vehicle's operation by an authorized individual, and are not capable of indicating to law enforcement officials the location of the vehicle after its successful theft. Some lock-out systems operate after a fixed time delay, creating extremely hazardous and potentially fatal situations where an authorized individual who has inadvertently failed to follow the proper procedures abruptly may have the vehicle's ignition or fuel cut off or its steering column locked during actual operation of the vehicle.

DISCLOSURE OF THE INVENTION

It is, therefore, an object of the present invention to provide an intrusion alarm and locating system for vehicles which is inexpensive and provides a radio frequency broadcast alarm signal.

It is a further object of the present invention to provide an intrusion alarm and locating system for vehicles, as above, utilizing a pre-existing, extensive alarm receiving network.

It is still a further object of the present invention to provide an intrusion alarm and locating system for vehicles, as above, with an independent, self-contained transmitter power supply such that any attempt at tampering with the intrusion alarm will result in the actuation of the transmitter.

These and other objects and advantages of the present invention over existing prior art forms will become more apparent and fully understood from the following description in conjunction with the accompanying drawings.

In general, an alarm circuit for detecting an unauthorized intrusion into a vehicle includes a transmitter for broadcasting a radio frequency alarm signal, the transmitter including a modulator generating a low frequency for modulating the radio frequency alarm signal at the low frequency, and a control unit for selectively activating the transmitter upon an unauthorized intrusion. The control means includes a voltage detector for detecting a drop in the voltage magnitude of the vehicle power supply and providing an output signal indicative thereof, a timer circuit receiving the output signal from the voltage detector and providing a transmitter actuation signal to the transmitter after a first preselected time delay, and a security switch for inhibiting the transmission of a signal from the timer circuit to the transmitter.

An alarm system for detecting an unauthorized intrusion into a vehicle and the location of the vehicle, includes a vehicle alarm installed on the vehicle for generating a radio frequency alarm signal upon the unauthorized intrusion into the vehicle, the radio frequency alarm signal being at a distress frequency in the citizen band frequency spectrum and being modulated at a low frequency, and a plurality of citizen band spectrum radio receivers tunable to the distress frequency in the citizen band frequency spectrum, the modulation of the radio frequency alarm signal producing a distinct and recognizable audio pattern detectable by the receivers over audio speech signals having substantially greater field strength.

BRIEF DESCRIPTION OF THE DRAWINGS

FIG. 4 is a further detailed block diagram of the exemplary individual vehicle alarm as depicted in FIG. 1, showing in partial schematic form an alarm control unit and tag transmitter.

DESCRIPTION OF A PREFERRED EMBODIMENT

Figure 1:
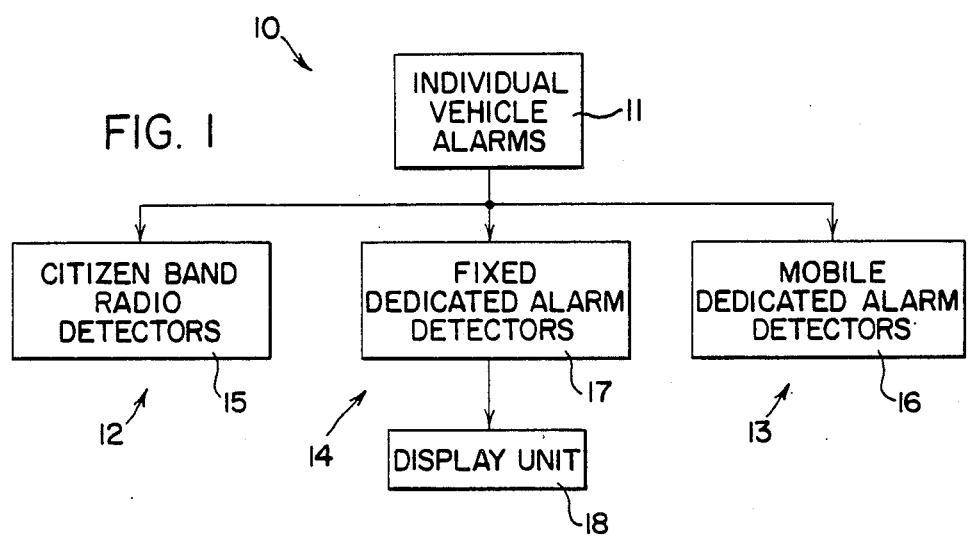
FIG. 1 is a block diagram of an intrusion alarm and locating system for vehicles in accordance with the concept of the present invention.

FIG. 1 illustrates a complete intrusion alarm and locating system for vehicles in accordance with the concept of the present invention, generally referred to by the numeral 10. Vehicle intrusion alarm and locating system 10 includes a vehicle alarm, one or more of which are identified in the drawings with the numeral 11 and is installed as hereinafter explained in each individual vehicle to be protected, and three distinct networks 12, 13 and 14 which may be alternatively or simultaneously employed to detect the whereabouts of each vehicle whose vehicle alarm 11 has been activated.

Network 12 utilizes the enormous number of citizen band radios 15 existing throughout the United States as a no-cost, pervasive detection scheme. As noted below, vehicle alarm 11 generates an audio modulated radio frequency (hereinafter called "RF") signal in the event of unauthorized intrusion into the vehicle. In order to avail this system of an inexpensive, pre-existing warning network, it is highly desirable to select such frequency to be the widely recognized distress frequency within the citizen band radio spectrum, 27.185 MHz, popularly referred to as "channel 19". In this manner, whenever a vehicle containing an activated alarm comes into close proximity with a citizen band radio receiver tuned to channel 19, the audio modulated alarm signal may be heard. Inasmuch as the majority of citizen band radios in the United States are themselves operated mobile in vehicles, the likelihood of detecting the RF signal from a vehicle containing an activated alarm is extremely high.

In order to uniquely identify a signal from vehicle alarm 11, and to insure that the signal is easily heard over other signals which may have many times its field strength, it is highly desirable to modulate the RF signal generated by vehicle alarm 11. The simplest yet most effective modulation pattern found has been that of a low audio frequency of approximately 10 Hz. Of course, it will be appreciated that other modulation patterns may be acceptable for use herewith.

In certain specialized applications it may be advantageous to provide a network 13 having mobile dedicated alarm detectors 16 whose receivers are fixedly tuned to the RF broadcast frequency of vehicle alarms 11. For example, vehicles used in law enforcement operations may be equipped with inexpensive receivers tuned to channel 19. Such receivers would serve the dual function of receiving both citizen band distress signals and the alarm signal from any individual vehicle alarm 11 in proximity to the law enforcement vehicle, and would permit police to immediately investigate and possibly recapture stolen vehicles having an activated vehicle alarm 11 installed therein.

Metropolitan areas having large numbers of vehicles in a given geographic area may further prefer to provide a network 14 having fixed dedicated alarm detectors 17 and a display unit 18. Fixed dedicated alarm detectors 17 may be inexpensive receivers tuned to channel 19 and mounted at preselected fixed locations throughout the geographic area of interest.

Figure 2:
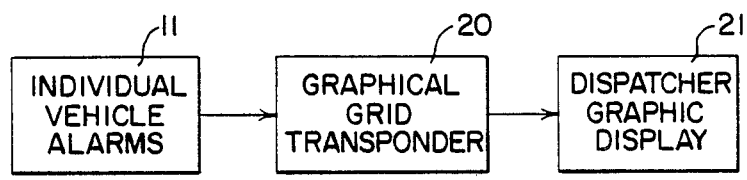
FIG. 2 is a block diagram of a portion of the intrusion alarm and locating system for vehicles of FIG. 1 particularly adopted to finding and displaying the location within a preselected geographic area of vehicles which have had their alarm system activated.

Once again by way of example, local law enforcement agencies could mount fixed dedicated alarm detectors 17 upon telephone poles or other elements at suitable intervals to provide complete reception coverage throughout their jurisdictional area. Rather than providing receivers which furnish an audible output signal, as shown in FIG. 2 graphical grid transponders 20 may be provided which furnish a system alarm signal for transmission via dedicated telephone lines or other suitable means to a central dispatch location for a display 21 to graphically present the relative geographic location of each transponder and visually and/or audibly distinguish those transponders 20 which are receiving an RF alarm signal.

Figure 3:
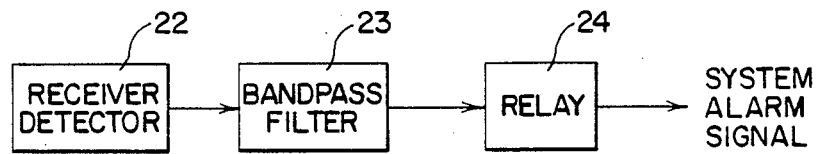
FIG. 3 is a further detailed block diagram of the exemplary graphical grid transponder depicted in FIG. 2.

As further detailed in FIG. 3, an exemplary graphical grid transponder 20 may include a conventional dedicated receiver 22 fixedly tuned to channel 19, the detector of which provides an output signal to a conventional bandpass filter 23. Bandpass filter 23 has a center frequency set to the modulation frequency, 10 Hz in the example herein. Upon reception of an RF signal modulated at 10 Hz, bandpass filter 23 provides an output to a relay 24 which produces the above noted system alarm signal.

An individual vehicle alarm 11 may be seen in FIG. 4 to broadly include an alarm control unit 25 and a tag transmitter 40. Alarm control unit 25 includes voltage drop detector 26, power supply filter 28, intrusion timer 30, exit timer 31, pushbutton 32, S-R flip flop 33, relay 34, relay contact 35, and security switch 36. Voltage drop detector 26, which is electrically connected to both terminals of vehicle battery 27, may be any of the numerous well-known detectors for monitoring a voltage magnitude and providing an output signal in the event a preselected maximum allowable change in the monitored voltage magnitude is exceeded.

Although the negative terminal of vehicle battery 27 is shown as being connected to ground, and connections to be made to such terminal may hereinafter be said to be grounded, it should be emphasized that alarm system 11 is equally suitable for use with an ungrounded or positive grounded vehicle electrical system.

The output of vehicle battery 27 is also received by power supply filter 28 including diode 29 and capacitor 37. The anode of diode 29 is connected to the positive terminal of vehicle battery 27. Capacitor 37 is connected across the negative terminal of vehicle battery 27 and the cathode of diode 29. The cathode of diode 29 and the negative terminal of vehicle battery 27 provide a filtered source of operating power for the electrical components of vehicle alarm 11.

Intrusion timer 30 receives the output signal from voltage drop detector 26 and the filtered power supply from power supply filter 28. Intrusion timer 30 may be any conventional timer providing an output signal after a preselected time delay following receipt of the output signal from voltage drop detector 26. Exit timer 31 receives the output signal from voltage drop detector 26 and is connected to one terminal of momentary contact pushbutton 32. Exit timer 31 also may be any conventional timer providing an output signal after a preselected time delay following the momentary closing of pushbutton 32.

The output signals from intrusion timer 30 and exit timer 31 are respectively received by the reset and set inputs to conventional S-R flip flop 33. The Q output signal from flip flop 33 and the filtered positive power signal from the cathode of diode 29 are connected to opposite ends of the coil (not shown) of a relay 34 such that upon receipt of a suitable logic level signal from flip flop 33 normally open relay contact 35 is closed and remains closed until flip flop 33 is reset by intrusion timer 30.

Security switch 36 includes a plurality of individual gangs each of which may be preset to a differing number such that only when all switch gangs are switched to their respective preset numbers will the input terminal of security switch 36 be connected to its output terminal. Security switch 36 may be provided with whatever number of gangs provides the desired level of protection by furnishing too many codes to quickly identify the proper combination. For most applications a four gang thumbwheel switch may be utilized as security switch 36, as depicted in FIG. 3.

Security switch 36 has its input terminal connected to ground, the movable contact of the gang adjacent the output connected to the terminal of pushbutton 32 opposite that connected to exit timer 31, and its output terminal connected to one side of relay contact 35. The side of relay contact 35 opposite that connected to security switch 36 is connected to ground. The signal across relay contact 35 is the output signal for alarm control unit 25 and provides the actuation command to tag transmitter 40.

Tag transmitter 40 includes a power gate 41, a low frequency modulator 46, and an RF oscillator 47. Power gate 41 includes batteries 42, 43, resistor 44 and field-effect transistor (hereinafter referred to as FET)

45. The positive terminal of battery 42 is connected to the side of relay contact 35 also connected to ground. The negative terminal of battery 42 is connected to the gate of FET 45. Resistor 44 is connected across the gate and source of FET 45. Battery 43 has its positive terminal connected to the source of FET 45 and its negative terminal connected to the side of relay contact 35 also connected to ground.

Low frequency modulator 46 may be any conventional modulator suitable for modulating the power supply to RF oscillator 47 at the selected low audio frequency. Low frequency modulator 46 is connected to the drain of FET 45 and the negative terminal of battery 43, and in turn provides a modulated output signal to RF oscillator 47. For reasons discussed hereinbefore, RF oscillator 47 should preferably be tuned to resonate at approximately 27.185 MHz, the citizen band radio distress frequency.

Having described the detailed construction of an exemplary vehicle alarm 11, its operation may now be delineated. The operation of vehicle alarm 11 may be more readily understood if it is first appreciated that vehicle alarm 11 is triggered by any change in the vehicle system's voltage magnitude greater than a preselected tolerable maximum. Inasmuch as virtually any entry to the vehicle or attempted start of the vehicle's ignition will cause such a change in the vehicle system's voltage magnitude as a result of voltage drops across lights and the starter motor, etc., such an alarm detection system is extremely reliable. However, since an authorized individual will also produce alarm triggering voltage drops upon entry to and exit from the vehicle, where vehicle alarm 11 is mounted in the interior of the vehicle for added security some means must be provided to temporarily disable the tag transmitter 40 while the authorized individual both enters the car and permanently disarms vehicle alarm 11, and exits the car after arming vehicle alarm 11. Intrusion timer 30 and exit timer 31, in conjunction with their associated circuitry, respectively provide this function during entry and exit.

During normal operation of the vehicle by an authorized individual, the security switch 36 is set to its preset, confidential code. In FIG. 4, aligning the movable contact of each gang from left to right adjacent the third, seventh, ninth, and third contact position from the top, respectively, will result in both sides of relay contact 35 being shorted together. This in turn connects batteries 42 and 43 in series. The resultant gate-source voltage effectively "pinches off" FET 45, precluding any power from being received by low frequency modulator 46 and RF oscillator 47. In short, security switch 36 has disabled tag transmitter 40 by shorting its input leads. The setting of the confidential code into security switch 36 may be referred to as "disarming" vehicle alarm 11.

When the authorized individual wishes to leave the vehicle and activate vehicle alarm 11, the authorized individual merely pushes pushbutton 32, momentarily connecting exit timer 31 to ground and starting exit timer 31. Exit timer 31 immediately generates and maintains an output signal which sets flip flop 33. The Q output of flip flop 33 in turn changes state, energizing relay 34 and closing normally open relay contact 35. As long as relay contact 35 remains closed tag transmitter 40 is again disabled as a result of its shorted input leads. By presetting the exit timer to have a delay sufficiently long to permit the authorized individual to depart the vehicle, say 120 seconds, no voltage drops caused by the authorized individual in departing the vehicle will trigger tag transmitter 40. As soon as pushbutton 32 is released, the authorized individual randomly resets security switch 36 to a code other than the preset, confidential code, completing the "arming" of individual vehicle alarm 11.

Thereafter, if for any reason the vehicle electrical system would evidence a drop in voltage magnitude, intrusion timer 30 would at the end of a preselected time delay generate an output signal which resets flip flop 33. The Q output of flip flop 33 in turn returns to its original state, deenergizing relay 34 and reopening relay contact 35. By presetting the intrusion timer to have a delay sufficiently long to permit the authorized individual to enter the vehicle and disarm the individual vehicle alarm 11 by resetting security switch 36, say 60 seconds, no voltage drops caused by the authorized individual in re-entering the vehicle will trigger tag transmitter 40. Of course, an unauthorized individual not knowing the preset, confidential code will be unable to stop the activation of tag transmitter 40. Moreover, should the leads to tag transmitter 40 be cut, power gate 41 containing its own independent power supply will immediately activate low frequency modulator 46 and RF oscillator 47 causing transmission of a modulated RF signal indicative of unauthorized entry.

In order to make vehicle intrusion alarm and locating system 10 as free from tampering as possible, it has been found to be greatly desirable to enclose all transmitter 40 components in a housing having the shape of a thin wafer or tag, which could be sandwiched between the vehicle's windshield layers during fabrication. By additionally incorporating a loading coil within RF oscillator 47, use of an external antenna becomes unnecessary, making system 10 further innocuous. It has also been found that such a configuration results in loosely coupling the RF signal to the windshield cavity itself, many of which have a natural resonance at approximately 30 MHz, thereby producing further signal gain.

Tag transmitter 40 may be made to be a low power output device, both to avoid the licensing requirements of governmental communications regulations and to extend the operating lifetime of batteries 42 and 43, the independent power supply for tag transmitter 40. Given the limited power requirements and short, if any, operational periods of tag transmitter 40, it is likely that conventional alkaline batteries 42 and 43 shall provide a useful operating lifetime approximately coextensive with that of the vehicle. Nevertheless, where desired, batteries 42 and 43 may be selected to be of the magnetically coupled rechargeable type, permitting recharging of batteries 42 and 43 within tag transmitter 40 without physical connection therewith.

Inasmuch as the present invention is subject to many variations, modifications and changes in detail, a number of which have been expressly stated herein, it is intended that all matter described throughout this entire specification or shown in the accompanying drawings be interpreted as illustrative and not in a limiting sense. It should thus be evident that a device constructed according to the concept of the present invention, and equivalent thereto, will accomplish the objects of the present invention and otherwise substantially improve the art of alarm systems for detecting the unauthorized entry into vehicles and the location thereof.

I claim:

1. An alarm circuit for detecting an unauthorized intrusion into a vehicle, comprising:

deactivation means for supplying a deactivation control signal;

transmitter means including oscillator means for broadcasting a radio frequency alarm signal, said transmitter means includes oscillator power supply means for continuously furnishing electrical power to said oscillator means, said oscillator power supply means adapted to continuously activate said transmitter means upon interruption of receipt of a deactivation control signal by said transmitter means, and power gate switch means for controlling the electrical connection of said oscillator power supply means with said oscillator means, said power gate switch means electrically interrupting the connection between said oscillator power supply means and said oscillator means at all times said deactivation control signal is received by said transmitter means;

said transmitter means further including power gate switch power supply means for operating said power gate switch means so as to establish and maintain electrical connection between said oscillator power supply means and said oscillator means at all times said deactivation control signal is not received by said transmitter means;

said oscillator power supply means, said power gate switch means and said oscillator means being electrically connected in series so as to form a first power loop, and, said power gate switch power means, said oscillator power supply means and said deactivation means being connected in series so as to form a second power loop, said power gate switch means electrically interrupting electrical power flow in said first power loop whenever electrical power is flowing in said second power loop;

said deactivation means selectively disabling the continuous activation of said transmitter means by furnishing said deactivation control signal to said transmitter means; and, control means for detecting an anauthorized intrusion into the vehicle and controlling the operational condition of said deactivation means.

2. An alarm circuit, as set forth in claim 1, wherein said transmitter means, said oscillator power supply means and said power gate switch power supply means are contained within the same housing.

3. An alarm circuit, as set forth in claim 1, wherein said deactivation means is located externally of said transmitter means and is electrically connected to said transmitter means, said radio frequency alarm signal being broadcast upon the interruption of said electrical connection between said deactivation means and said transmitter means.

4. An alarm circuit, as set forth in claim 1, wherein said deactivation means includes a contact whose closure state is controlled by said control means so as to interrupt power flow in said second power loop upon the detection of an unauthorized intrusion into the vehicle, the closure state of said contact providing said deactivation control signal to said transmitter means.

* * * * *